(12) United States Patent
Al Adnani

(10) Patent No.: US 7,898,936 B2
(45) Date of Patent: Mar. 1, 2011

(54) COMBINED OFDM AND WAVELET MULTI-CARRIER TRANSCEIVER

(75) Inventor: Adnan Al Adnani, London (GB)

(73) Assignee: Panasonic Corporation, Osaka (JP)

( * ) Notice: Subject to any disclaimer, the term of this patent is extended or adjusted under 35 U.S.C. 154(b) by 91 days.

(21) Appl. No.: 12/063,355

(22) PCT Filed: Jul. 13, 2006

(86) PCT No.: PCT/EP2006/006930
§ 371 (c)(1),
(2), (4) Date: Aug. 7, 2008

(87) PCT Pub. No.: WO2007/022831
PCT Pub. Date: Mar. 1, 2007

(65) Prior Publication Data
US 2008/0316912 A1    Dec. 25, 2008

(30) Foreign Application Priority Data
Aug. 22, 2005 (EP) .................................. 05255165

(51) Int. Cl.
H04L 5/04 (2006.01)
(52) U.S. Cl. ........................ 370/210; 370/208; 375/260
(58) Field of Classification Search ......... 370/200–253; 382/261, 128; 375/260
See application file for complete search history.

(56) References Cited

U.S. PATENT DOCUMENTS 6,704,438 B1 * 3/2004 Alexandru .................. 382/128
2004/0184400 A1 * 9/2004 Koga et al. .................. 370/208

OTHER PUBLICATIONS

Yongzhe et al (A combined DMT/DWMT system for DSL application, Signal processing 80(2000) 185-195, Aug. 19, 1999).*
Michael et al. (DMT Systems, DWMT systems and Digital Filter Banks, 0-7803-1825-094 IEEE, 1994) teaches DMT Systems, DWMT systems and Digital Filter Banks.*
Yongzhe Aug. 19, 1999, DMT/DWMT system for DSL application, Signal processing 80(2000) 185-195.*
Yongzhe Xie et al.: A Combined DMT/SWMT System for DSL Application; Signal Processing, Amsterdam, NL, vol. 80, No. 1, Jan. 2000, pp. 185-195.
Andrea M. Tonello et al.: An Efficient Implementation of a Wavelet, Based Filtered Multitone Modulation Scheme, Signal Processing and Information Technology, 2004, Proceedings of the Fourth IEEE International Symposium on Rome, Italy, Dec. 18-21, 2004, Piscataway, NJ, USA, IEEE, Dec. 18, 2004, pp. 225-228.
Michael. A. Tzannes et al.: DMT Systems, DWMT Systems and Digital Filter Banks, Communications, 1994. ICC '94, Supercomm/ICC '94, Conference Record, 'Serving Humanity Through Communications.' IEEE International Conference on New Orleans, LA, USA May 1-5, 1994, New York, NY, USA, IEEE May 1, 1994, pp. 311-315.
International Search Report dated Oct. 5, 2006.

* cited by examiner

Primary Examiner—Ricky Ngo
Assistant Examiner—Iqbal Zaidi
(74) Attorney, Agent, or Firm—RatnerPrestia

(57) ABSTRACT

A multicarrier transmitter and receiver uses a first inverse fast Fourier transformer for performing an Inverse Fast Fourier Transform (IFFT) on a parallel input data signal, an imaginary component filter for filtering out the imaginary component of an output signal of the first transformer and a real component filter for filtering out the real component of the output signal of the first. The multicarrier transmitter and receiver also uses a first polyphase filter having real coefficients. The first filter accepts output data from the imaginary component filter. The multicarrier transmitter and receiver also uses a second polyphase filter having real coefficients which are selected as the real coefficients of the first filter with the sign of each odd-numbered real coefficient inverted. The second filter accepts output data from said real component filter. A combined OFDM and wavelet multi-carrier transceiver is proposed sharing an IFFT block.

20 Claims, 8 Drawing Sheets

| Signal | Size (bits) | Type | Description |
| --- | --- | --- | --- |
| s1 | 1 | input | 0 = select OFDM path 1<br>1 = select OFDM path 2 |
| s2 | word | input | Size of Serial-to-Parallel M |
| s3 | word | input | Size of Serial-to-Parallel L |
| s4 | word | input | Size of FFT L |
| s5 | word | input | Size of FFT M |
| s6 | word | input | First prototype filter coefficients. |
| s7 | word | input | Second prototype filter coefficients. |
| s8 | 3 | input | Channel selector |

Figure 8

COMBINED OFDM AND WAVELET MULTI-CARRIER TRANSCEIVER

FIELD OF THE INVENTION

The present invention is directed to the implementation of a reconfigurable multimode multi-carrier transceiver using shared resources.

BACKGROUND

There is a trend in multi-carrier mobile communication consumer equipment towards the provision of multimode wireless services using various standards which are continuously being updated. As the demand for personalised applications suited to diverse needs continues to grow, there is an increasing need for multimode terminals which can provide seamless connectivity between different multi-carrier modes and which can be upgraded according to user needs.

One widely used mode of implementing multi-carrier communications is the use of Orthogonal Frequency Division Multiplexing (OFDM). OFDM is a spread spectrum modulation technique which distributes data over a large number of carriers which are spaced apart at precise frequencies. Because of the fact that OFDM subcarrier pulses are chosen to be rectangular, the task of pulse forming and modulation can be performed by a simple Inverse Discrete Fourier Transform (IDFT) which can be efficiently implemented using an Inverse Fast Fourier Transform (IFFT) block. In the wireless domain, OFOM is used in the newer forms of IEEE 802.11 wireless LAN (WLAN) designs and in the IEEE 802.16-2004 (WiMAX) specifications for metropolitan area networking. It has also recently been proposed as the basis for successors to 3G cellular communication systems. In the wired area, OFDM is referred to as discrete multi-tone (DMT) and is the basis for the ADSL standard.

Another multi-carrier communication mode which is being considered for future standards is the Digital Wavelet Multi-Carrier (DWMC) system. Although more costly to implement, DWMC does provide several advantages over OFDM, specifically in regard to Additive White Gaussian Noise channel performance, Raleigh fading channel performance and Signal to Noise Ratios (SNR). Pulse forming and modulation in DWMC systems is performed using the Inverse Wavelet Transform (IWT).

IWT and IFFT based systems each have their own advantages and disadvantages. IFFT systems are inexpensive and have grown into an industry standard, while IWT based systems show better performance in most situations. This has created a need for a multimode transceiver design which can be used for future Inverse Wavelet Transform (IWT) based systems as well as legacy systems based on the Inverse Fast Fourier Transform (IFFT). The industry has responded to this need by producing multimode transceiver terminals which can support both IFFT and IWT mode operation.

However, conventional multimode terminals employ fixed Application Specific Integrated Circuits (ASICs) for each mode. This implementation is not cost effective in that at least one dedicated ASIC needs to be designed for each of the IFFT and IWT modes. Also, the presence of multiple dedicated ASICs increases the size of the transceivers. Furthermore, due to design rigidity, ASICs based multimode transceivers cannot be upgraded or reconfigured.

Thus, because of the current progressive shift in certain areas of wireless services from IFFT based to IWT based systems and the bulkiness and high cost of current multimode systems, there is a clear need for a multi-mode transceiver design which uses shared resources to implement both IFFT and IWT based communication modes.

SUMMARY OF THE INVENTION

The present invention solves the problems of the prior art by providing a multi-carrier transmitter for performing data transmission, said multi-carrier transmitter comprises:

a first inverse fast Fourier transformer for performing an Inverse Fast Fourier Transform (IFFT) on a parallel input data signal;

an imaginary component filter for filtering out the imaginary component of an output signal of the first inverse fast Fourier transformer;

a real component filter for filtering out the real component of the output signal of the first inverse fast Fourier transformer;

a first prototype filter comprising a polyphase filter having real coefficients, said first prototype filter accepting output data from said imaginary component filter;

a second prototype filter comprising a polyphase filter having real coefficients which are selected by taking the real coefficients of the first prototype filter and inverting the sign of each odd-numbered real coefficient, said second prototype filter accepting output data from said real component filter;

a modulator for performing Single Side Band (SSB) modulation by using the output from said first prototype filter as an in-phase signal of complex information and the output from the second prototype filter as an orthogonal signal of complex information.

Preferably, the multi-carrier transmitter further comprises:
a first parallel-to-serial converter for converting the output of the first prototype filter from a parallel to a serial data signal; and
a second parallel-to-serial converter for converting the output of the second prototype filter from a parallel to a serial data signal.

Preferably, the multi-carrier transmitter further comprises:
a third parallel-to-serial converter for converting the output of the first inverse fast Fourier transformer from a parallel to a serial data signal.

Preferably, the multi-carrier transmitter further comprises:
a channel selector for selecting a signal which is to be sent to the modulator, wherein the channel selector is arranged to select either,
the output of the first parallel-to-serial converter and the output of the second parallel-to-serial converter, or
the output of the third parallel-to-serial converter.

Preferably, the multi-carrier transmitter further comprises:
a second inverse fast Fourier transformer for performing an Inverse Fast Fourier Transform (IFFT) on a parallel input data signal.
a fourth parallel-to-serial converter for converting the output of the second inverse fast Fourier transformer from a parallel to a serial data signal.

Preferably, the channel selector for selecting a signal which is to be sent to said modulator is arranged to select either,
the output of the first parallel-to-serial converter and the output of the second parallel-to-serial converter,
the output of the third parallel-to-serial converter, or
the output of the fourth parallel-to-serial converter.

Preferably, the multi-carrier transmitter further comprises:
a first serial-to-parallel converter for performing serial to parallel conversion on a serial input data signal, wherein the output of the first serial-to-parallel converter is input into the first inverse fast Fourier transformer; and a second serial-to-parallel converter for performing serial to parallel conversion on a serial input data signal, wherein the output from the second serial-to-parallel converter is input into the second inverse fast Fourier transformer.

Preferably, the multi-carrier transmitter further comprises:

a multiplexer for controlling the path of the serial input data signal towards either the first serial-to-parallel converter or to the second serial-to-parallel converter.

Preferably, the first inverse fast Fourier transformer, the second inverse fast Fourier transformer, the imaginary component filter, the real component filter, the first prototype filter, the second prototype filter, the first parallel-to-serial converter, the second parallel-to-serial converter, the third parallel-to-serial converter, the fourth parallel-to-serial converter and the multiplexer are all of variable size.

Preferably, the multi-carrier transmitter further comprises:

configuration means arranged to independently configure the size of each variable sized component.

Preferably, the configuration means are also arranged to configure the real coefficients of the first prototype filter and the second prototype filter.

Preferably, the configuration means are also arranged to control the multiplexer and the channel selector.

The present invention also provides a multi-carrier receiver for performing data reception, said multi-carrier receiver comprises:

a demodulator for performing Single Side Band (SSB) demodulation on a received data signal;

a first serial-to-parallel converter for serial to parallel converting a serial data signal output from the demodulator into a parallel input data signal;

a first fast Fourier transformer for performing a Fast Fourier Transform (FFT) on a parallel input data signal;

an imaginary component filter for filtering out the imaginary component of an output signal of the first fast Fourier transformer;

a real component filter for filtering out the real component of the output signal of the first fast Fourier transformer;

a first prototype filter comprising a polyphase filter having real coefficients, said first prototype filter accepting output data from said imaginary component filter;

a second prototype filter comprising a polyphase filter having real coefficients which are selected by taking the real coefficients of the first prototype filter and inverting the sign of each odd-numbered real coefficient, said second prototype filter accepting output data from said real component filter.

Preferably, the multi-carrier receiver further comprises:

a first parallel-to-serial converter for converting the output of the first prototype filter from a parallel to a serial data signal; and a second parallel-to-serial converter for converting the output of the second prototype filter from a parallel to a serial data signal.

Preferably, the multi-carrier receiver further comprises:

a third parallel-to-serial converter for converting the output of the first fast Fourier transformer from a parallel to a serial data signal.

Preferably, the multi-carrier receiver further comprises:

a channel selector for selecting a signal which is to be received, wherein the channel selector is arranged to select either, the output of the first parallel-to-serial converter and the output of the second parallel-to-serial converter, or the output of the third parallel-to-serial converter.

Preferably, the multi-carrier receiver further comprises:

a second fast Fourier transformer for performing a Fast Fourier Transform (FFT) on a parallel input data signal.

a fourth parallel-to-serial converter for converting the output of the second fast Fourier transformer from a parallel to a serial data signal.

Preferably, the channel selector for selecting a signal which is to be received is arranged to select either, the output of the first parallel-to-serial converter and the output of the second parallel-to-serial converter, the output of the third parallel-to-serial converter, or the output of the fourth parallel-to-serial converter.

Preferably, the multi-carrier receiver further comprises:

a first serial-to-parallel converter for performing serial to parallel conversion on a serial input data signal, wherein the output of the first serial-to-parallel converter is input into the first fast Fourier transformer; and a second serial-to-parallel converter for performing serial to parallel conversion on a serial input data signal, wherein the output from the second serial-to-parallel converter is input into the second fast Fourier transformer.

Preferably, the multi-carrier receiver further comprises:

a multiplexer for controlling the path of the received data signal toward either the first serial-to-parallel converter or to the second serial-to-parallel converter.

Preferably, the first fast Fourier transformer, the second fast Fourier transformer, the imaginary component filter, the real component filter, the first prototype filter, the second prototype filter, the first parallel-to-serial converter, the second parallel-to-serial converter, the third parallel-to-serial converter, the fourth parallel-to-serial converter and the multiplexer are all of variable size.

Preferably, the multi-carrier receiver further comprises:

configuration means arranged to independently configure the size of each variable bit sized component.

Preferably, the configuration means are also arranged to configure the real coefficients of the first prototype filter and the second prototype filter.

Preferably, the configuration means are also arranged to control the multiplexer and the channel selector.

BRIEF DESCRIPTION OF THE DRAWINGS

In the figures:

FIG. 8 is a table showing the control signal structure of both the transmitter of FIG. 6 and the receiver of FIG. 7.

DETAILED DESCRIPTION

Figure 1:
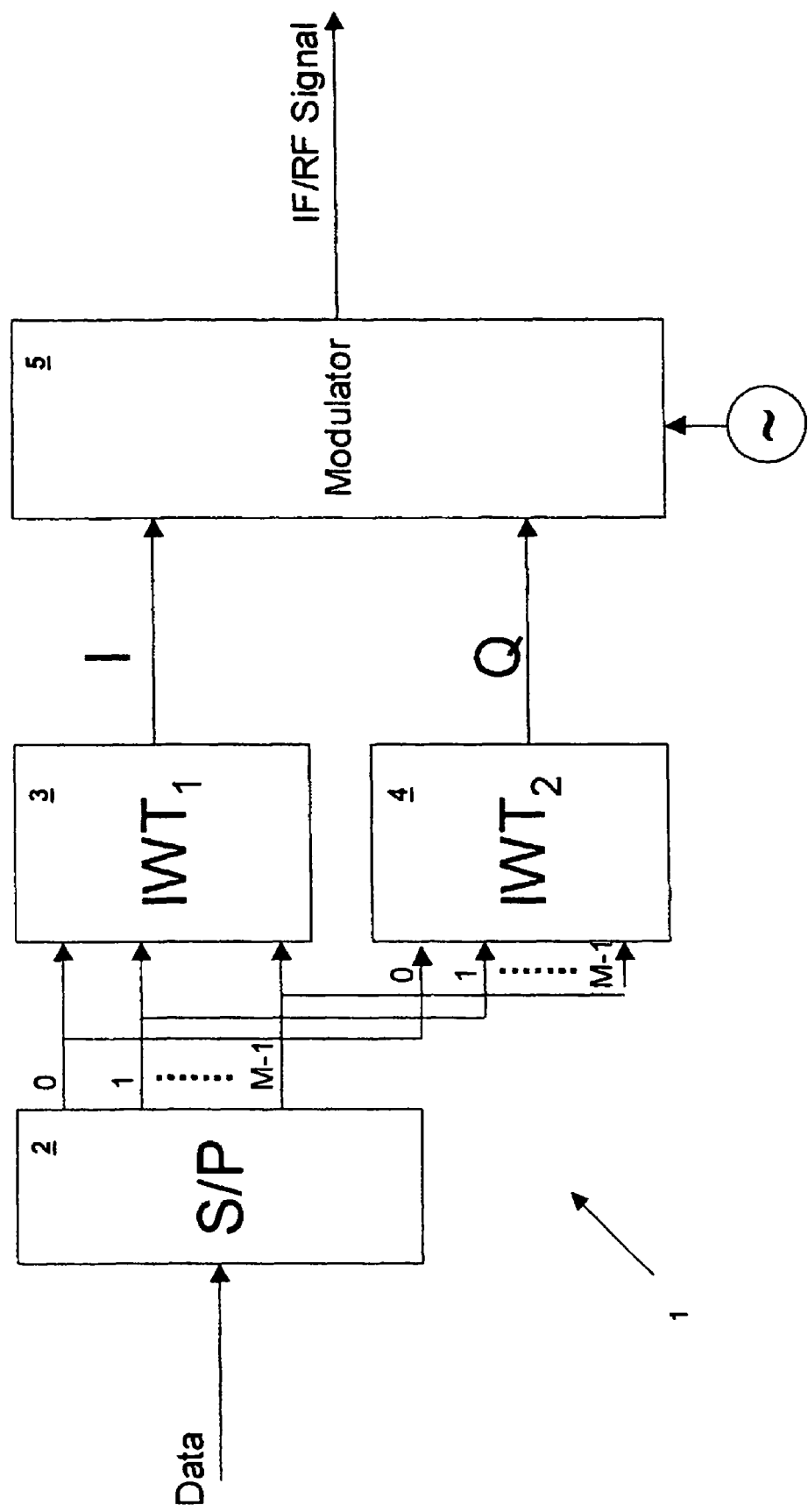
FIG. 1 is a block diagram of a multi-carrier wavelet transmitter according to the prior art.

In reference to FIG. 1, a Digital Wavelet Multi Carrier (DWMC) transmitter 1, in accordance with the prior art, is shown. The DWMC transmitter 1 performs data transmission by way of digital modulation using a real coefficient wavelet filter bank. Known DWMC systems perform digital modulation/demodulation using a real coefficient wavelet filter bank that is based on a multi-carrier modulation system. These communication systems synthesize a plurality of digitally modulated waves to generate a send signal by way of a real coefficient wavelet filter bank. The system then uses standard pulse-amplitude modulation (PAM) to modulate each sub-carrier.

A serial bit-stream of data which is to be transmitted using the DWMC transmitter of FIG. 1 is first sent to a serial-to-parallel converter 2. Then, the data is processed in parallel by a first Inverse Wavelet Transform (IWT) block 3 and a second Inverse Wavelet Transform block 4 producing In-phase (I) and Quadrature-phase (Q) signals which are up-converted by an IF/RF modulator block 5 for transmission.

Now, in reference to FIGS. 2a and 2b, the detailed implementations of the first IWT block 3 and the second IWT block 4 will now be described.

In FIG. 2a, parallel data is processed by a Discrete Cosine Transform (DCT) block 6 followed by a first prototype filter block 8 and finally by a first parallel-to-serial converter 10 to produce the in-phase (I) signal. In FIG. 2b, the parallel data is processed by a Discrete Sine Transform (DST) block 7 followed by a second prototype filter block 9 and finally by a second parallel-to-serial converter 11 to produce the quadrature phase (Q) signal.

Figure 3:
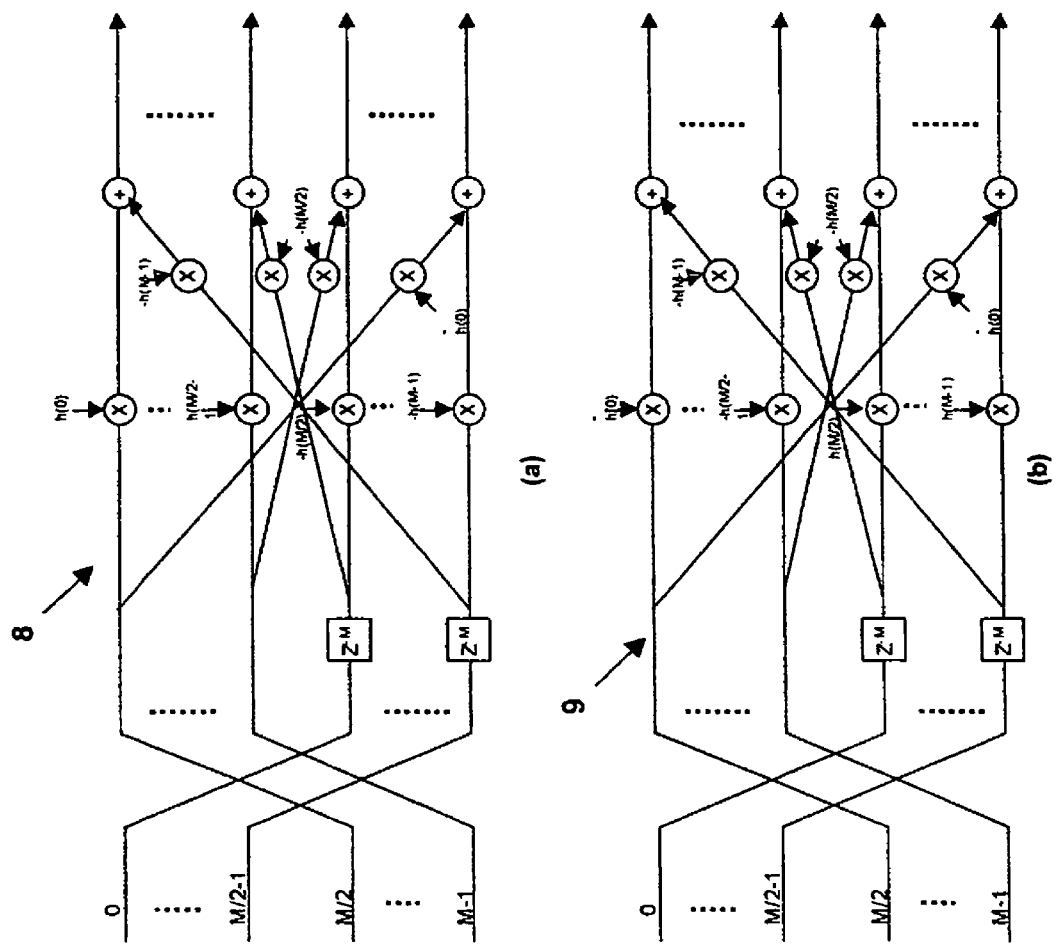
FIG. 3a is a representation of the structure of the prototype filter 1 of FIG. 2a according to the prior art.
FIG. 3b is a representation of the structure of the prototype filter 2 of FIG. 2b according to the prior art.

FIGS. 3a and 3b show the structure of the first prototype filter 8 and the second prototype filter 9. Both filters are identical except for the change in sign in the filter coefficients.

Traditionally, wavelet transmitter and receiver filters have had identical finite impulse responses and have been implemented digitally as multi-rate filter banks using poly-phase filtering techniques which significantly reduce computational requirements. As seen from the prior art, wavelet transform based systems require dedicated processing blocks like DSTs and DCTs that are not used by other legacy standards, thus cannot be shared while in this mode of operation.

However, for one dimensional signals, the DCT block 6 can be mathematically represented by the following equations, where N is the length of the DCT filter:

$$y(k) = \sqrt{\frac{2}{N}} \alpha(k) \sum_{n=0}^{N-1} x(n) \cos \frac{(2n+1)k\pi}{2N}; \quad k = 0, 1, \ldots N-1$$

$$x(n) = \sqrt{\frac{2}{N}} \sum_{k=0}^{N-1} \alpha(k) y(k) \cos \frac{(2n+1)k\pi}{2N}; \quad n = 0, 1, \ldots N-1$$

$$\alpha(0) = \frac{1}{\sqrt{2}} \text{ and } \alpha(k) = 1; \quad k \neq 0$$

As can be seen from these equations, the Discrete Cosine Transform has a frequency of length 2N DFT (as opposed to N DFT). Thus, a real signal, the real part of the DFT is similar to the DCT. Moreover, the real part of a double-length FFT is the same as the DCT, but for the half-sample phase shift in the sinusoidal basis functions and a negligible scaling factor of 2. Consequently, the DCT can be implemented using the same basic efficiency techniques as the FFT.

But for a constant scaling factor, forward and backward (inverse) transforms have identical transformation kernels. The basis vectors are sampled cosines which have phase shifts that are not given by an alternating 0 and π/2 pattern as in the sines and cosines of a DFT. The DCT basis vectors are:

$$b_k = \left\{ \sqrt{\frac{2}{N}} \alpha(k) \cos \frac{(2n+1)k\pi}{2N} \right\}_{N=1,2,\ldots,N-1} \quad k = 0, 1, \ldots, N-1$$

The fast computation procedure consists of extending the input block of N samples to a 2N-block with even symmetry, taking a 2N point DFT, and saving N terms in it. The DFT of a real and symmetric sequence contains only real coefficients corresponding to the cosine of the series.

The extension can defined as:

$$x'(n) \begin{cases} x(n) & n = 0, 1, \ldots, N-1 \\ x(2N-1-n) & n = N, N+1, \ldots 2N-1 \end{cases}$$

The 2N-DFT of x'(n) is:

$$y'(k) = \frac{1}{\sqrt{2N}} \sum_{n=0}^{2N-1} x'(n) e^{-j(2\pi kn/2N)}$$

$$= \frac{1}{\sqrt{2N}} e^{jk\pi/2N} \sum_{n=0}^{N-1} x(n) \cos\left[\frac{(2n+1)k\pi}{2N}\right]$$

By comparing it with y(k), it can be shown that:

$$y(k) = \alpha(k) e^{-jk\pi/2N} y'(k)$$

Thus, as has been appreciated by the applicant, the DST transform is similar to the DCT except for the sin term in the equation. It follows that the Discrete Sine Transform needed for a Inverse Wavelet Transform can also be generated from the Discrete Fourier Transform. Accordingly, the present invention uses a shared IFFT block to implement a Wavelet Transceiver system as well as a legacy OFDM system.

Figure 2:
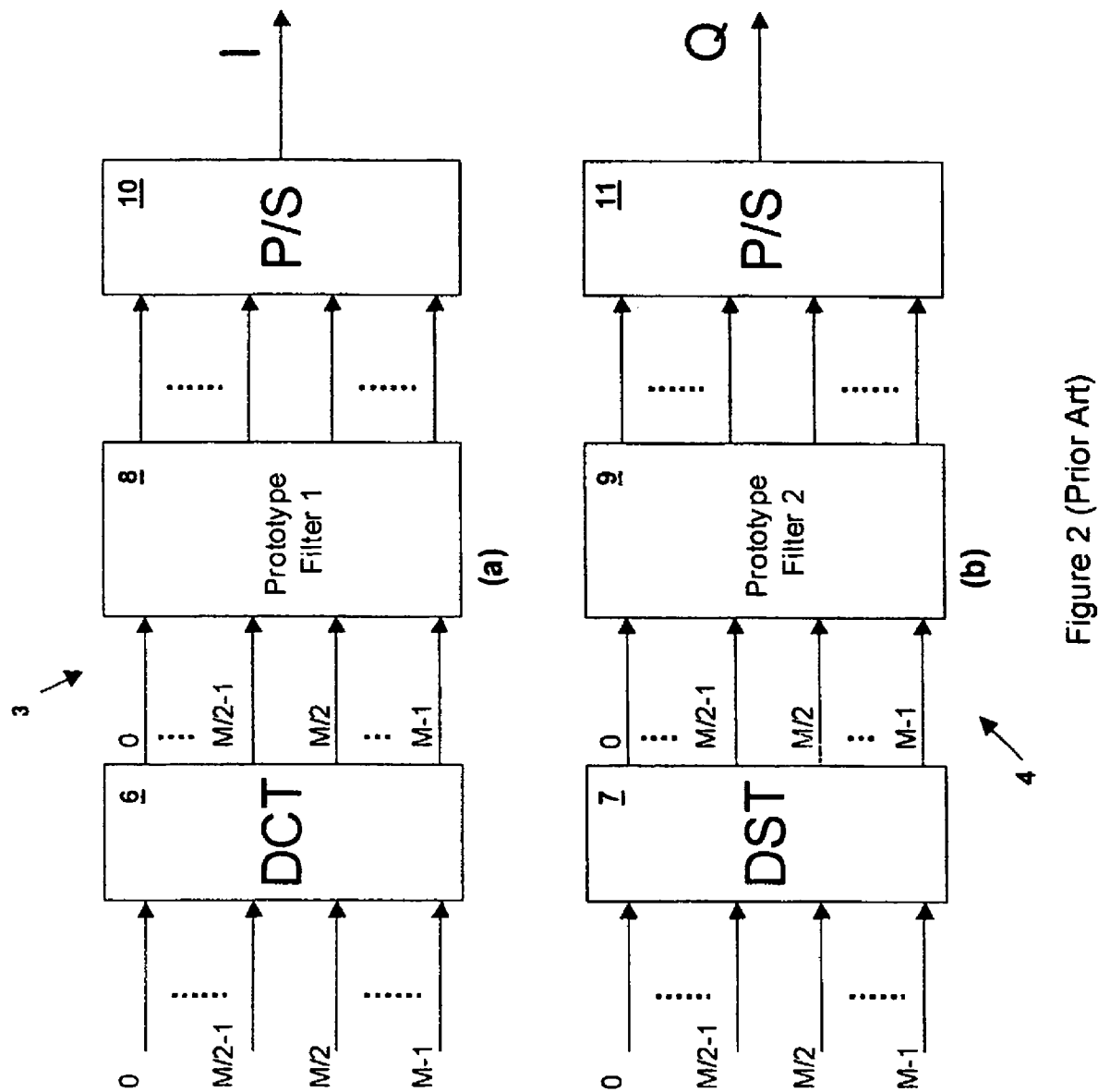
FIG. 2a is a block diagram of the inverse wavelet transform module $IWT_1$ of FIG. 1 according to the prior art.
FIG. 2b is a block diagram of the inverse wavelet transform module $IWT_2$ of FIG. 1 according to the prior art.
Figure 4:
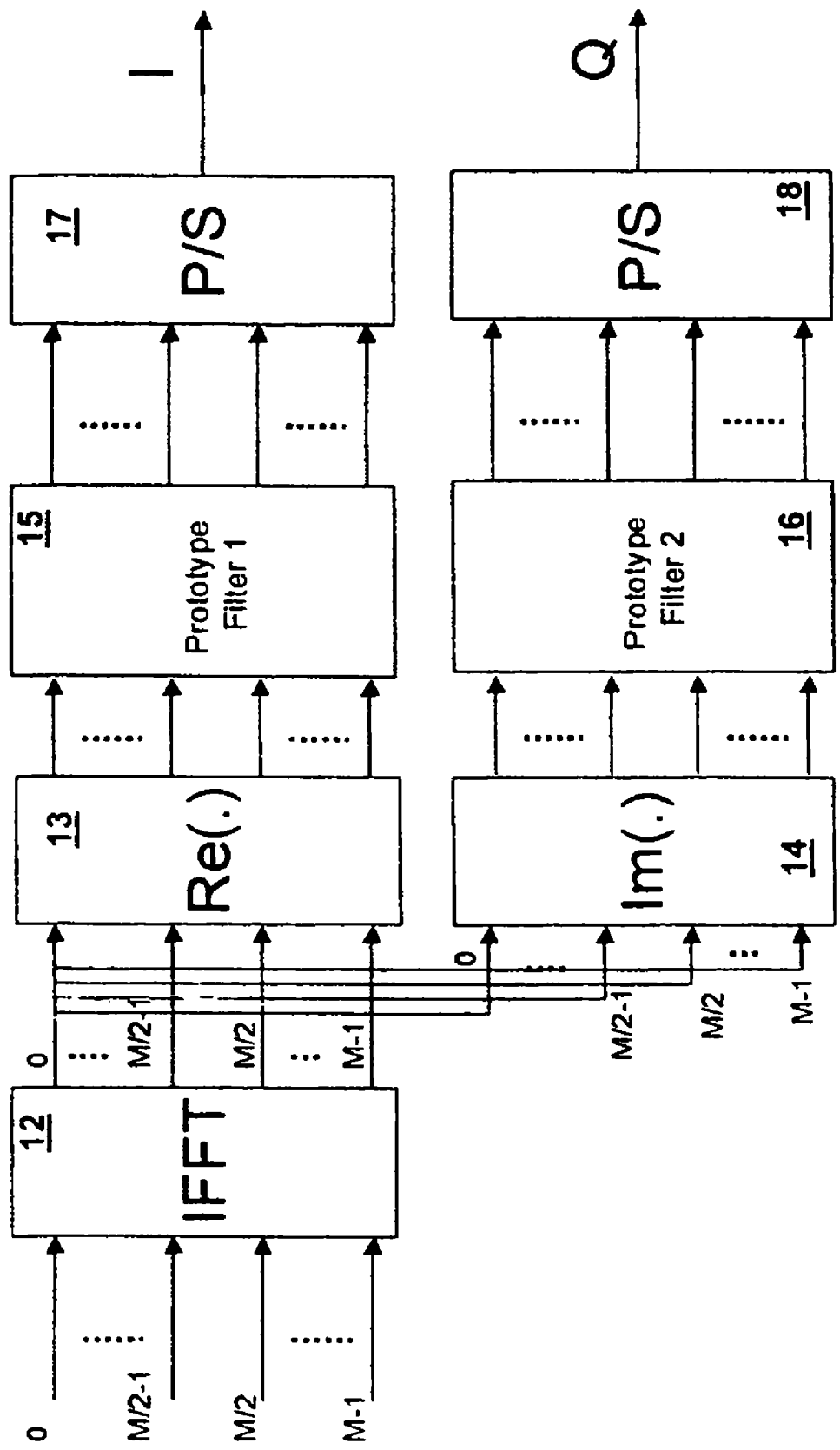
FIG. 4 is a block diagram of a Wavelet multi-carrier transmitter implementation according to the present invention.

FIG. 4 shows a transmitter according to a first embodiment of the present invention where an equivalent transmitter to the one shown in FIGS. 1 and 2 is implemented using an IFFT block 12. The real part of the complex IFFT is equivalent to a DST, and the Imaginary part of the FFT is equivalent to a DCT. The real filter block 13 filters out the imaginary component of the signal and the imaginary filter 14 filters out the real part of the signal. Both the first prototype filter 15 and the second prototype filter 16 are the same as in the prior art.

Figure 5:
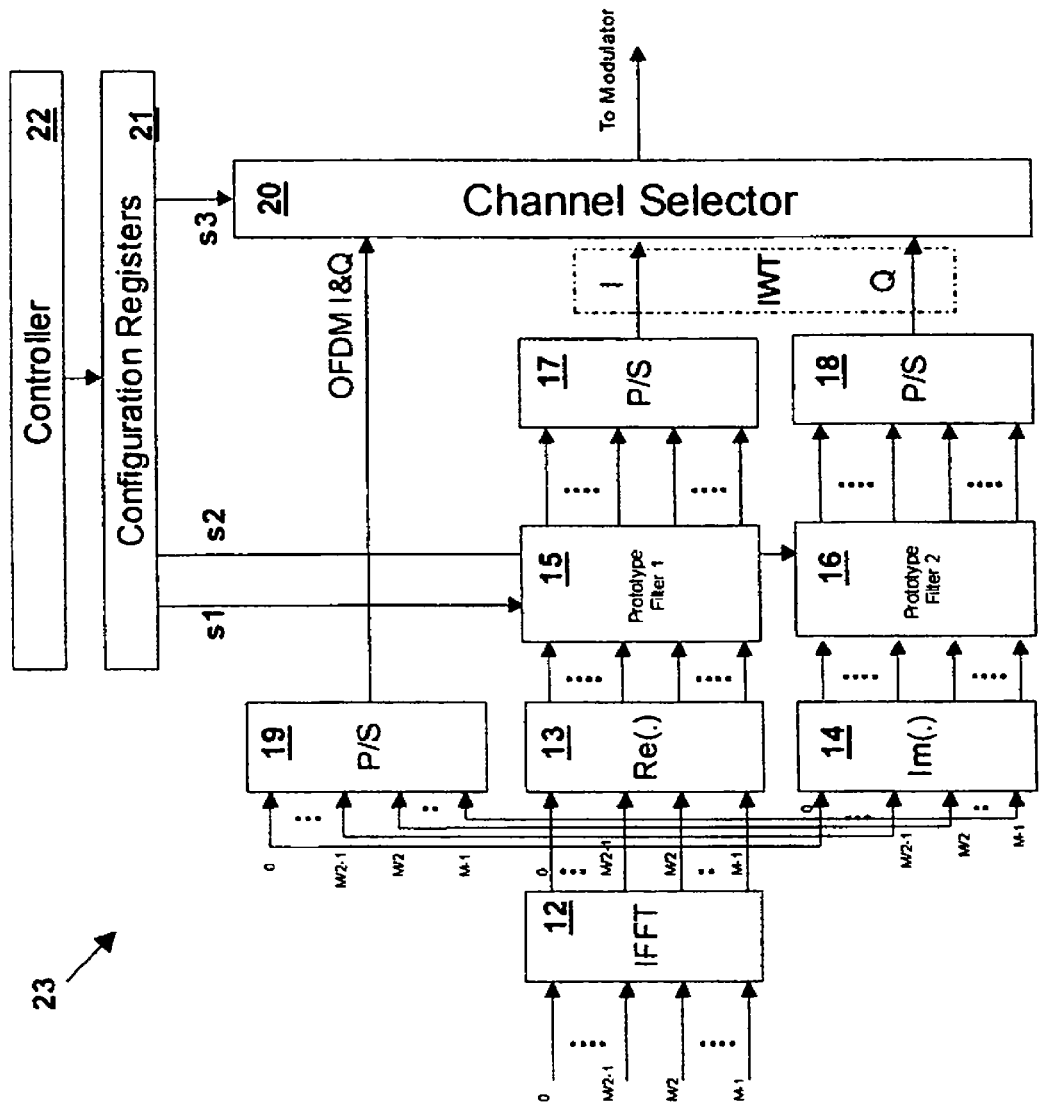
FIG. 5 is a block diagram of an Orthogonal Frequency Division Multiplexed and Wavelet multi-carrier transmitter according to the present invention.

FIG. 5 shows a reconfigurable multi-mode transmitter 23 according to a second embodiment of the present invention. A parallel input data signal is passed through an IFFT block 12, the output of which is used to generate the IWT signal for multimode operation, as described in the previous embodiment. The output of the IFFT block 12 is also sent to a parallel-to-serial converter 19, the output of which is sent to a channel selector 20 for use in OFDM mode operation.

The embodiment shown in FIG. 5 allows for the update of the filter coefficients and the selection of modes using a controller 22. In the system of FIG. 5, the controller 22 is used to configure the configuration registers 21 in order to set the values of signals s1, s2 and s3. A configuration register file is used to store the configuration control words which permit the selection of a particular configuration. The configuration control registers 21 provide control bits for multiplexers, registers and memories. The configurations register file has a size of M (number of stored configurations)×N (configurations bits). Thus, multiple configurations can be stored in the configuration registers 21. After filing the configuration registers 21, in normal operation mode, rapid switches between configurations can be performed. The configuration registers 21 can be reconfigured by changing the control signals output from the controller 22.

The value of signal s1 will determine the filter coefficients for the first prototype filter 15 and that of signal s2 will determine the filter coefficients for the second prototype filter 16. The value of signal s3 will determine whether the channel selector uses the I and Q signals output from parallel-to-serial blocks 17 and 18, for IWT mode operation, or the I and Q signal output from the parallel-to-serial block 19, for OFDM mode operation.

Figure 6:
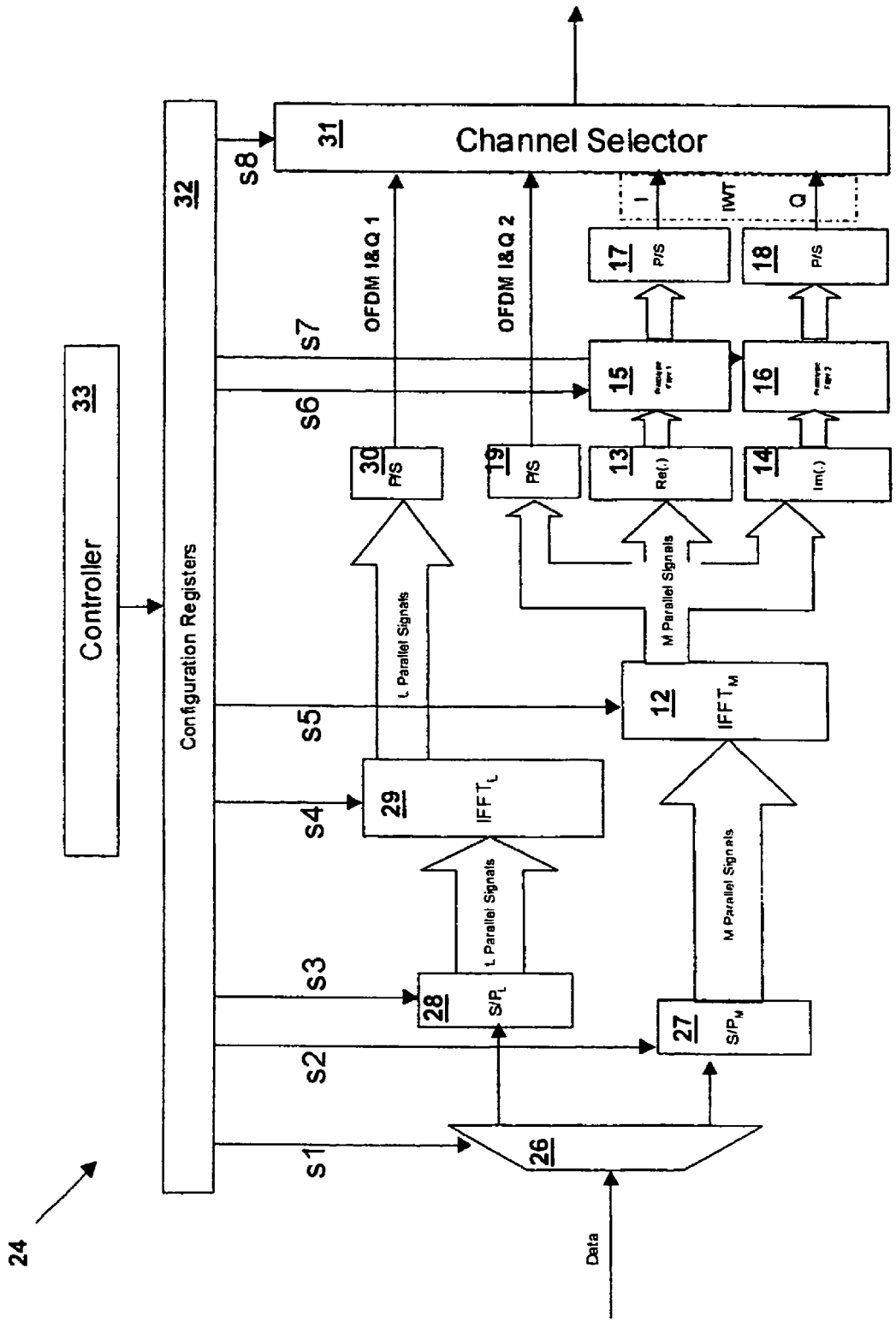
FIG. 6 is a block diagram of a reconfigurable multimode multi-carrier transmitter according to the present invention.
Figure 7:
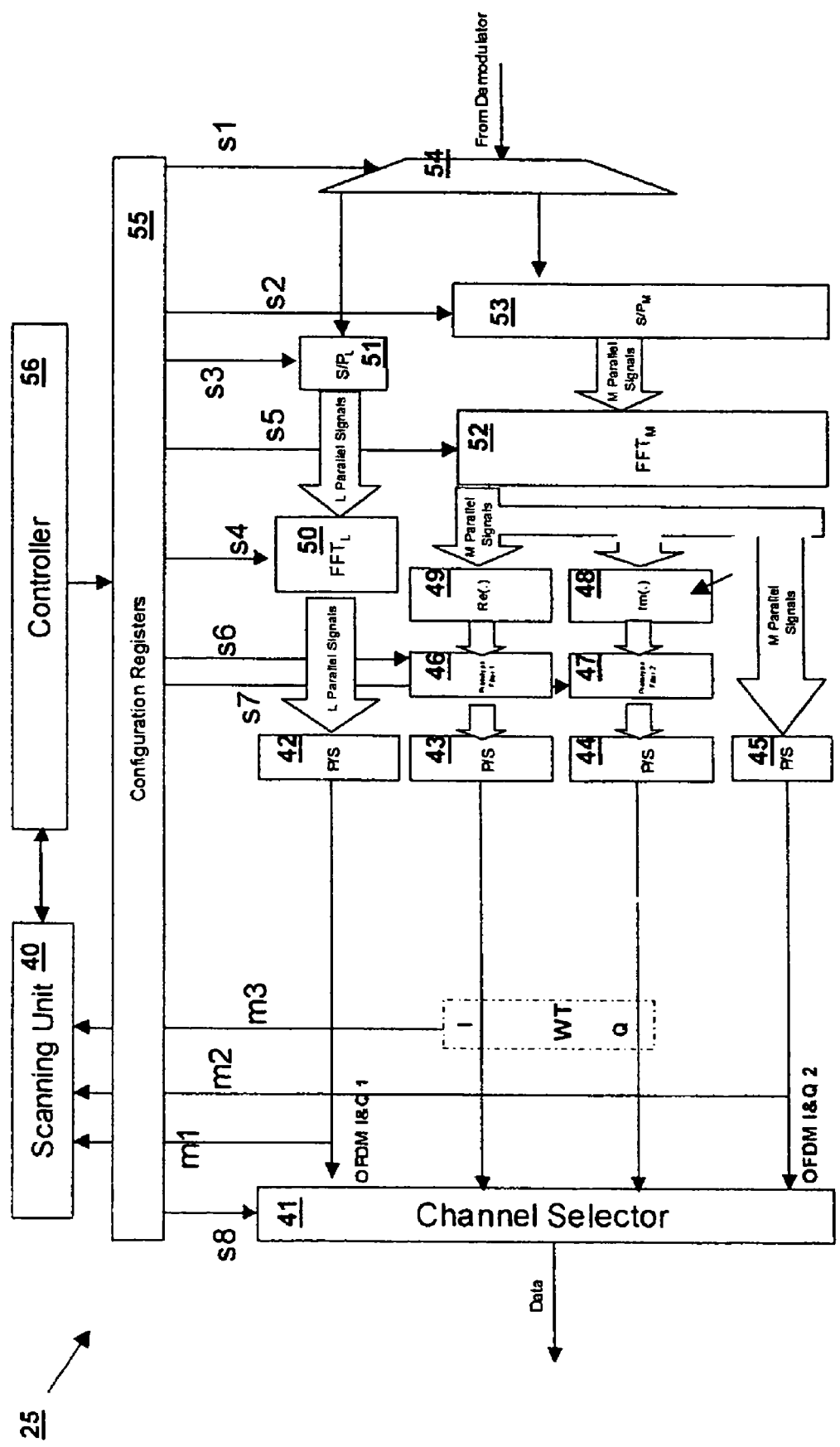
FIG. 7 is a block diagram of a reconfigurable multimode multi-carrier receiver according to the present invention.

FIGS. 6 and 7 show a reconfigurable multi-mode transmitter 24 and receiver 25 respectively. As will be apparent to the skilled reader, except for the IFFT and FFT blocks, the components in the transmitter are the same as those in the receiver. Also, the operation of the receiver can be viewed as the mirror image of that of the transmitter. In this embodiment, second IFFT/FFT blocks 29 and 50 are introduced to allow implementation of various FFT block sizes and to allow dynamic FFT block reconfiguration. Through the use of configuration registers 32 and 55, controllers 33 and 56 can dynamically reconfigure the mode and implementation parameters of the transmitter/receiver through signals s1 to s8. FIG. 8 shows the control signal structure for the embodiment of FIGS. 6 and 7.

With reference to FIG. 6 and FIG. 8, the operation of the reconfigurable multi-mode transmitter 24 will now be described. Serial data enters a multiplexer 26 that is controlled by signal s1, output from the configuration registers 32 to determine the path of the data to either the first serial-to-parallel converter 27 or the second serial to parallel converter 28.

If s2 is set to "1", the path to the first serial-to-parallel converter 27 will be chosen, where M is the number of parallel signals. The size of the first serial-to-parallel converter 27 is configures by control signal s2. The M parallel signal are then processed by the IFFTM block 12, whose size is configured by control signal s5. The IFFTM block 12 can, as described in previous embodiment, produce a second OFDM signal as well as IWT I&Q signals, all of which are sent to channel selector 31.

If s1 is set to "0", the path to the second serial-to-parallel converter 28 will be chosen, where L is the number of parallel signals. The size of the second serial-to-parallel converter 28 is configures by control signal s3. The L parallel signals are then processed by IFFT block 29, whose size is configured by control signal s4 to accommodate different quantisation requirement for FFT processing from, for example, 64 samples in WLAN to up to 2048 samples and DVB. Finally, the I&Q OFDM signal is produced by parallel-to-serial block 30 and sent to the channel selector 31.

FIG. 7 shows a reconfigurable multi-mode receiver 25, where the reverse operations are implemented. The multiplexer 54 and channel selector 41 can be configured to select individual channel modes or simultaneous reception. The other control signals are used as in the transmitter 24.

While operating in one of the modes selected by the multiplexer 54, using control signal s1, the controller 56 can dynamically reconfigure the other signal path blocks by changing the serial-to-parallel and FFT sizes without stopping the operation of the receiver 25. The channel selector 41 selects the mode of operation required using control signals s1 and s8, and a scanning unit 40 can monitor the signal paths being introduced into the channel selector 41 using signals m1, m2, and m3, thereby scanning for other available modes in order for the controller 56 to dynamically switch to another mode if required.

The invention claimed is:

1. A multi-carrier transmitter for performing data transmission, said multi-carrier transmitter comprising:
   a first inverse fast Fourier transformer for performing an Inverse Fast Fourier Transform (IFFT) on a parallel input data signal;
   an imaginary component filter for filtering out the imaginary component of an output signal of the first inverse fast Fourier transformer;
   a real component filter for filtering out the real component of the output signal of the first inverse fast Fourier transformer;
   a first prototype filter comprising a polyphase filter having real coefficients, said first prototype filter accepting output data from said imaginary component filter;
   a second prototype filter comprising a polyphase filter having real coefficients which are selected by taking the real coefficients of the first prototype filter and inverting the sign of each odd-numbered real coefficient, said second prototype filter accepting output data from said real component filter;
   a modulator for performing Single Side Band (SSB) modulation by using the output from said first prototype filter as an in-phase signal of complex information and the output from the second prototype filter as an orthogonal signal of complex information;
   a first parallel-to-serial converter for converting the output of the first prototype filter from a parallel to a serial in-phase Inverse Wavelet Transform (IWT) signal;
   a second parallel-to-serial converter for converting the output of the second prototype filter from a parallel to a serial quadrature-phase Inverse Wavelet Transform (IWT) signal; and
   a third parallel-to-serial converter for converting the output of the first inverse fast Fourier transformer from a parallel to a serial data signal for Orthogonal Frequency Division Multiplexing (OFDM).

2. The multi-carrier transmitter of claim 1, further comprising:
   a channel selector for selecting a signal which is to be sent to the modulator, wherein the channel selector is arranged to select either,
   the output of the first parallel-to-serial converter and the output of the second parallel-to-serial converter, or
   the output of the third parallel-to-serial converter.

3. The multi-carrier transmitter of claim 2, further comprising:
   a second inverse fast Fourier transformer for performing an Inverse Fast Fourier Transform (IFFT) on a parallel input data signal; and
   a fourth parallel-to-serial converter for converting the output of the second inverse fast Fourier transformer from a parallel to a serial data signal.

4. The multi-carrier transmitter of claim 3, wherein
   the channel selector for selecting a signal which is to be sent to said modulator is arranged to select either,
   the output of the first parallel-to-serial converter and the output of the second parallel-to-serial converter,
   the output of the third parallel-to-serial converter, or
   the output of the fourth parallel-to-serial converter.

5. The multi-carrier transmitter of claim 3 further comprising:
   a first serial-to-parallel converter for performing serial to parallel conversion on a serial input data signal, wherein the output of the first serial-to-parallel converter is input into the first inverse fast Fourier transformer; and a second serial-to-parallel converter for performing serial to parallel conversion on a serial input data signal, wherein the output from the second serial-to-parallel converter is input into the second inverse fast Fourier transformer.

6. The multi-carrier transmitter of claim 5, further comprising:

a multiplexer for controlling the path of the serial input data signal towards either the first serial-to-parallel converter or to the second serial-to-parallel converter.

7. The multi-carrier transmitter of claim 6, wherein, the first inverse fast Fourier transformer, the second inverse fast Fourier transformer, the imaginary component filter, the real component filter, the first prototype filter, the second prototype filter, the first parallel-to-serial converter, the second parallel-to-serial converter, the third parallel-to-serial converter, the fourth parallel-to-serial converter and the multiplexer are all of variable size.

8. The multi-carrier transmitter of claim 7, further comprising:

configuration means arranged to independently configure the size of each variable sized component.

9. The multi-carrier transmitter of claim 8, wherein, the configuration means are also arranged to configure the real coefficients of the first prototype filter and the second prototype filter.

10. The multi-carrier transmitter of claim 8 wherein, the configuration means are also arranged to control the multiplexer and the channel selector.

11. A multi-carrier receiver for performing data reception, said multi-carrier receiver comprising:

a demodulator for performing Single Side Band (SSB) demodulation on a received data signal;

a first serial-to-parallel converter for serial to parallel converting a serial data signal output from the demodulator into a parallel input data signal;

a first fast Fourier transformer for performing a Fast Fourier Transform (FFT) on a parallel input data signal;

an imaginary component filter for filtering out the imaginary component of an output signal of the first fast Fourier transformer;

a real component filter for filtering out the real component of the output signal of the first fast Fourier transformer;

a first prototype filter comprising a polyphase filter having real coefficients, said first prototype filter accepting output data from said imaginary component filter;

a second prototype filter comprising a polyphase filter having real coefficients which are selected by taking the real coefficients of the first prototype filter and inverting the sign of each odd-numbered real coefficient, said second prototype filter accepting output data from said real component filter;

a first parallel-to-serial converter for converting the output of the first prototype filter from a parallel to a serial in-phase Inverse Wavelet Transform (IWT) signal;

a second parallel-to-serial converter for converting the output of the second prototype filter from a parallel to a serial quadrature-phase Inverse Wavelet Transform (IWT) signal; and a third parallel-to-serial converter for converting the output of the first fast Fourier transformer from a parallel to a serial data signal for Orthogonal Frequency Division Multiplexing (OFDM).

12. The multi-carrier receiver of claim 11, further comprising:

a channel selector for selecting a signal which is to be received, wherein the channel selector is arranged to select either, the output of the first parallel-to-serial converter and the output of the second parallel-to-serial converter, or the output of the third parallel-to-serial converter.

13. The multi-carrier receiver of claim 12, further comprising:

a second fast Fourier transformer for performing a Fast Fourier Transform (FFT) on a parallel input data signal; and a fourth parallel-to-serial converter for converting the output of the second fast Fourier transformer from a parallel to a serial data signal.

14. The multi-carrier receiver of claim 13, wherein the channel selector for selecting a signal which is to be received is arranged to select either, the output of the first parallel-to-serial converter and the output of the second parallel-to-serial converter, the output of the third parallel-to-serial converter, or the output of the fourth parallel-to-serial converter.

15. The multi-carrier receiver of claim 13 further comprising:

a first serial-to-parallel converter for performing serial to parallel conversion on a serial input data signal, wherein the output of the first serial-to-parallel converter is input into the first fast Fourier transformer; and a second serial-to-parallel converter for performing serial to parallel conversion on a serial input data signal, wherein the output from the second serial-to-parallel converter is input into the second fast Fourier transformer.

16. The multi-carrier receiver of claim 15, further comprising:

a multiplexer for controlling the path of the received data signal toward either the first serial-to-parallel converter or to the second serial-to-parallel converter.

17. The multi-carrier receiver of claim 16, wherein, the first fast Fourier transformer, the second fast Fourier transformer, the imaginary component filter, the real component filter, the first prototype filter, the second prototype filter, the first parallel-to-serial converter, the second parallel-to-serial converter, the third parallel-to-serial converter, the fourth parallel-to-serial converter and the multiplexer are all of variable size.

18. The multi-carrier receiver of claim 17, further comprising:

configuration means arranged to independently configure the size of each variable bit sized component.

19. The multi-carrier receiver of claim 18, wherein, the configuration means are also arranged to configure the real coefficients of the first prototype filter and the second prototype filter.

20. The multi-carrier receiver of claim 18 wherein, the configuration means are also arranged to control the multiplexer and the channel selector.

* * * * *